(12) United States Patent
Tanaka et al.

(10) Patent No.: US 8,944,202 B2
(45) Date of Patent: Feb. 3, 2015

(54) CONSTRUCTION MACHINE

(75) Inventors: Tomoyuki Tanaka, Tsuchiura (JP); Hajime Ishii, Tsuchiura (JP); Shougo Kimura, Tsuchiura (JP)

(73) Assignee: Hitachi Construction Machinery Co., Ltd, Tokyo (JP)

( * ) Notice: Subject to any disclaimer, the term of this patent is extended or adjusted under 35 U.S.C. 154(b) by 262 days.

(21) Appl. No.: 13/702,862

(22) PCT Filed: Jun. 7, 2011

(86) PCT No.: PCT/JP2011/063066
§ 371 (c)(1),
(2), (4) Date: Dec. 7, 2012

(87) PCT Pub. No.: WO2011/155495
PCT Pub. Date: Dec. 15, 2011

(65) Prior Publication Data
US 2013/0078068 A1    Mar. 28, 2013

(30) Foreign Application Priority Data

Jun. 9, 2010   (JP) ................................. 2010-132054

(51) Int. Cl.
*B60J 5/04* (2006.01)
*B62D 33/06* (2006.01)
*E02F 9/16* (2006.01)
*E02F 3/32* (2006.01)

(52) U.S. Cl.
CPC ............... *E02F 9/163* (2013.01); *B60J 5/0487* (2013.01); *B62D 33/0617* (2013.01); *E02F 3/325* (2013.01)
USPC ....................... 180/89.12; 414/687; 296/146.5

(58) Field of Classification Search
CPC .... B60J 5/0487; B60J 5/107; B62D 33/0617; E02F 9/163; E02F 3/325

USPC .............. 180/89.12, 89.13; 296/146.5, 146.9; 414/687, 744.2
See application file for complete search history.

(56) References Cited

U.S. PATENT DOCUMENTS

| | | | |
|---|---|---|---|
| 7,438,349 B2 * | 10/2008 | Jo et al. .................... | 296/190.11 |
| 8,556,331 B2 * | 10/2013 | Tsumiyama et al. ...... | 296/146.5 |
| 2008/0093883 A1 * | 4/2008 | Shibata et al. ............ | 296/146.9 |
| 2012/0137594 A1 * | 6/2012 | Zhang et al. ................ | 49/476.1 |
| 2013/0322999 A1 * | 12/2013 | Kimura et al. ............... | 414/687 |
| 2014/0017053 A1 * | 1/2014 | Tanaka et al. ................ | 414/687 |

FOREIGN PATENT DOCUMENTS

| | | |
|---|---|---|
| JP | 1-175490 U | 12/1989 |
| JP | 2002-294754 A | 10/2002 |

(Continued)

OTHER PUBLICATIONS

International Search Report dated Sep. 13, 2011 with English translation (four (4) pages).

*Primary Examiner* — Drew Brown
(74) *Attorney, Agent, or Firm* — Crowell & Moring LLP (57) ABSTRACT

A compact excavator includes an operator's cab with a door capable of opening and closing an opening surface forming a boarding port. The door includes one door piece, and has a flexing portion which is closer to a front pillar than the central portion of the door when the door is in a closed state. The flexing portion is shaped to have a first area so formed that when the door is in a closed state, the first area approaches the opening surface as the first area approaches the front pillar, and a second area arranged continuously with the first area and nearer the front pillar than the first area and being formed so that the second area draws away from the opening surface as the second area approaches the front pillar.

5 Claims, 4 Drawing Sheets

(56) References Cited

FOREIGN PATENT DOCUMENTS

| | | |
|---|---|---|
| JP | 2005-67533 A | 3/2005 |
| JP | 2005-226307 A | 8/2005 |
| JP | 2006-21753 A | 1/2006 |
| JP | 2007-162313 A | 6/2007 |
| JP | 2010-7369 A | 1/2010 |

* cited by examiner

CONSTRUCTION MACHINE

TECHNICAL FIELD

The present invention relates to a construction machine such as a compact excavator provided with an operator's cab having a door capable of opening and closing an opening surface forming a boarding port.

BACKGROUND ART

As this type background-art technique, there is a hydraulic excavator forming a compact slewing device as disclosed in Patent Document 1. The hydraulic excavator has an undercarriage, an upper structure disposed on the undercarriage, a work device attached to the upper structure, and a cab, that is, an operator's cab, provided on the upper structure and having a door capable of opening and closing an opening surface forming a boarding port. The operator's cab has a left front pillar disposed on the work device side, that is, a front pillar, and a center pillar to which the door is attached rotatably, that is, a door mounting pillar. The front pillar and the door mounting pillar are provided to put the boarding port therebetween.

In addition, the door consists of two door pieces coupled with each other through a plurality of hinges in order to prevent the operator's cab from protruding outside the essentially requested turning radius of the upper structure which is not larger than the vehicle width in the hydraulic excavator forming a compact slewing device. The hinges are attached to edge portions of the respective door pieces provided vertically in a center portion of the whole door consisting of the two door pieces.

If the door were formed out of one door piece to increase the operator's cab, the turning radius of the upper structure would be beyond the aforementioned essentially requested turning radius which is not larger than the vehicle width. Thus, the slewing of the upper structure might be restricted by the work environment so as to cause troubles in various works performed by means of the work device of the hydraulic excavator forming the compact slewing device.

CITATION LIST

Patent Literature

Patent Literature 1: JP-A-2006-21753

SUMMARY OF INVENTION

Technical Problem

According to the background-art technique disclosed in Patent Document 1, the whole door is formed out of two door pieces so that the essentially requested turning radius which is not larger than the vehicle width can be secured. However, a plurality of hinges coupling the two door pieces with each other are provided in the center portion of the whole door, and these hinges are attached to the edge portions of the respective door pieces. Accordingly, it is impossible to secure a good field of view for an operator seated on an operator's seat in the operator's cab. In addition, since the hinges are required in the center portion of the whole door, the number of parts increases. Thus, the manufacturing cost may increase easily.

The present invention has been accomplished in consideration of the aforementioned actual situation in the background art. An object of the invention is to provide a construction machine capable of securing a turning radius not larger than the vehicle width, capable of securing a good field of view for an operator seated on an operator's seat, and capable of reducing the number of components.

Solution to Problem

In order to attain the foregoing object, according to the present invention, there is provided a construction machine including an undercarriage, an upper structure disposed on the undercarriage, a work device attached to the upper structure, and an operator's cab provided on the upper structure and having a door capable of opening and closing an opening surface forming a boarding port, the operator's cab including a front pillar and a door mounting pillar which are provided to put the boarding port therebetween, the front pillar being disposed on the work device side, the door being rotatably attached to the door mounting pillar, the construction machine being characterized in that: the door consists of one door piece, and has a flexing portion which is closer to the front pillar than a center portion of the door when the door is in a closed state; and the flexing portion is formed into a shape having a first area which is formed so that, when the door is in a closed state, the first area approaches the opening surface as the first area approaches the front pillar, and a second area which is arranged continuously with the first area and nearer the front pillar than the first area and which is formed so that the second area draws away from the opening surface as the second area approaches the front pillar.

According to the invention configured thus, the flexing portion is provided nearer the front pillar than the center portion of the door, and the flexing portion is formed into a shape having a first area which is formed so that when the door is closed, the first area approaches the opening surface forming the boarding port as the first area approaches the front pillar, and a second area which is arranged continuously with the first area and which is formed so that the second area draws away from the aforementioned opening surface as the second area approaches the front pillar. Accordingly, it is possible to provide a door whose shape does not bring about any change in the basic design of the operator's cab. That is, since it is not necessary to form the operator's cab largely for installing the door, it is possible to secure the turning radius not larger than the vehicle width.

In addition, since the flexing portion is provided nearer the front pillar than the center portion of the door, it is possible to form the center portion of the door to overhang outside the flexing portion. Thus, it is possible to prevent the door from gaining entrance into the operator's cab while securing a large space in the operator's cab.

In addition, since the door consists of one door piece, a plurality of hinges and members to which the hinges are attached do not have to be provided in the center portion of the door. Thus, it is possible to secure a good field of view for an operator seated on the operator's seat. In addition, it is possible to reduce the number of components.

Further, since the door is provided with the flexing portion nearer the front pillar than the center portion, it is possible to secure high rigidity in the flexing portion, and it is therefore possible to improve air tightness when the door is closed.

In addition, according to the invention, there is provided the aforementioned configuration of the invention characterized in that: the flexing portion is formed into a shape which is disposed substantially inside a turning radius of the upper structure defined to be not larger than a vehicle width of the undercarriage when the door is in a completely open state. According to the invention configured thus, even when a work is carried out in the state where the door is completely open, the upper structure can be slewed well without being influenced by the flexing portion provided thus. Thus, the work can be carried out.

In addition, according to the invention, there is provided the aforementioned configuration of the invention characterized in that: the flexing portion is formed into a shape in which an end portion of the second area of the flexing portion is located on the turning radius when the door is in a completely open state.

In addition, according to the invention, there is provided the aforementioned configuration of the invention characterized in that: a recess portion which receives the end portion of the second area of the flexing portion when the door is in a closed state is provided in the front pillar. According to the invention configured thus, the end portion of the second area of the flexing portion of the door is received in the recess portion of the front pillar when the door is closed. Accordingly, the end portion of the second area of the flexing portion can be prevented from being disposed outside the front pillar. This contributes to keeping the turning radius not larger than the vehicle width.

In addition, according to the invention, there is provided the aforementioned configuration of the invention characterized in that: the construction machine consists of a compact excavator, which is provided with a step for making it easy to get on and off the operator's cab, and a protrusion portion which protrudes outward from the opening surface is provided in a part of the step while a convex portion which covers the protrusion portion of the step when the door is in a closed state is provided in a part of the door.

According to the invention configured thus, the protrusion portion protruding outward from the opening surface forming a boarding port of the operator's cab is provided only in a part of the step. Thus, the protrusion portion can be provided in the step without changing the outer shell shape of the operator's cab. That is, the dimensions of the shape of the step can be increased without increasing the turning radius. In addition, when the door is closed, the protrusion portion provided in the step is covered with the convex portion provided in a part of the door, so that the whole step including the protrusion portion can be located in the operator's cab. Accordingly, it is possible to prevent fallen snow from being frozen on the step even when the construction machine is placed in a cold district where snow falls.

Advantageous Effects of Invention

According to the invention, a door for opening and closing an opening surface forming a boarding port consists of one door piece, and has a flexing portion provided nearer a front pillar than a center portion of the door when the door is in a closed state. The flexing portion is formed into a shape having a first area which is formed so that, when the door is in a closed state, the first area approaches the opening surface as the first area approaches the front pillar, and a second area which is arranged continuously with the first area and nearer the front pillar than the first area and which is formed so that the second area draws away from the opening surface as the second area approaches the front pillar. It is therefore possible to secure a turning radius not larger than the vehicle width without forming a large operator's cab. Thus, according to the invention, a work device for slewing an upper structure can be driven to perform a desired work without trouble.

In addition, according to the invention, the center portion of the door can be formed to overhang outside the flexing portion. Thus, it is possible to prevent the door from gaining entrance into the operator's cab while securing a large space in the operator's cab. This contributes to securing good operationality for an operator seated in the operator's cab.

In addition, according to the invention, a plurality of hinges and members to which the hinges are attached do not have to be provided in the center portion of the door so that it is possible to secure a good field of view for the operator seated on the operator's seat, and the operationality performed by the operator can be improved in comparison with that in the background art. In addition, it is possible to reduce the number of components so that it is possible to reduce the manufacturing cost in comparison with that in the background art.

Further, according to the invention, it is possible to secure high rigidity in the flexing portion, so that it is possible to improve air tightness in comparison with that in the background art when the door is closed, and it is possible to obtain a highly reliable door structure in the operator's cab.

DESCRIPTION OF EMBODIMENTS

An embodiment of a construction machine according to the invention will be described below with reference to the drawings.

Figure 1:
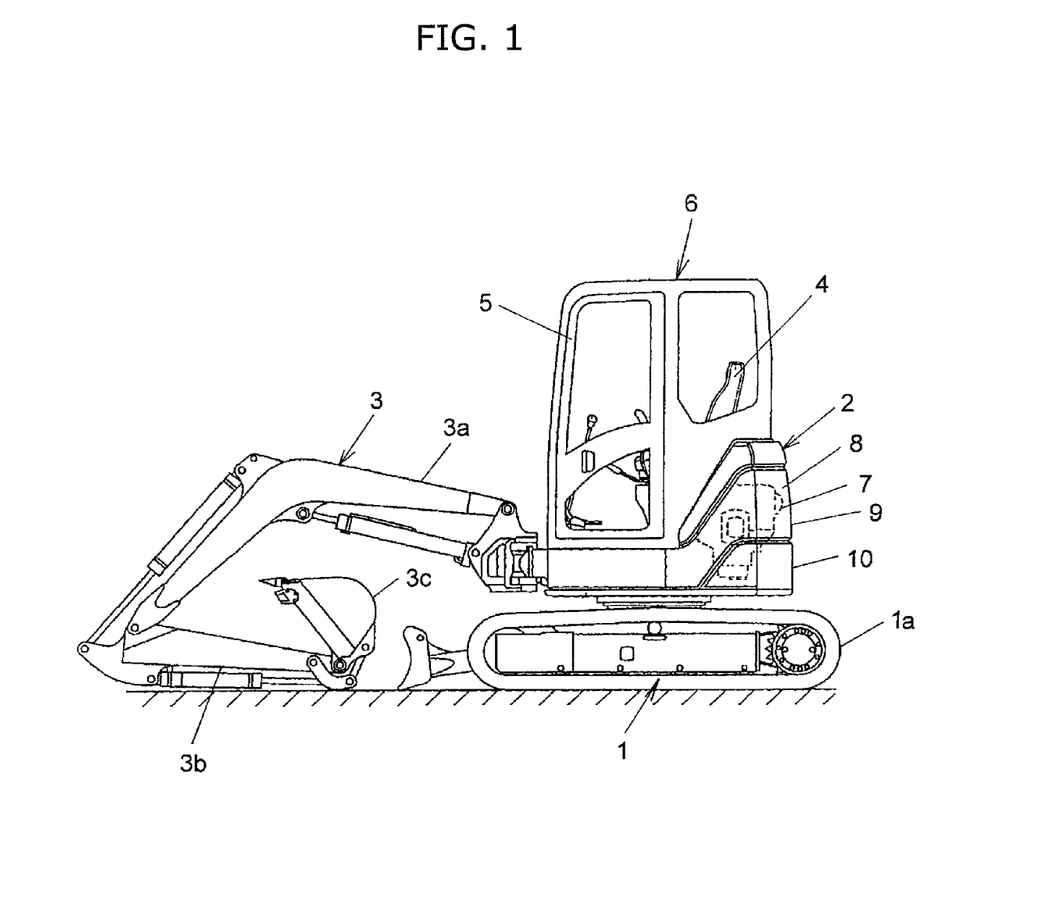
FIG. 1 A side view showing a compact excavator arranged as an embodiment of a construction machine according to the invention.
Figure 2:
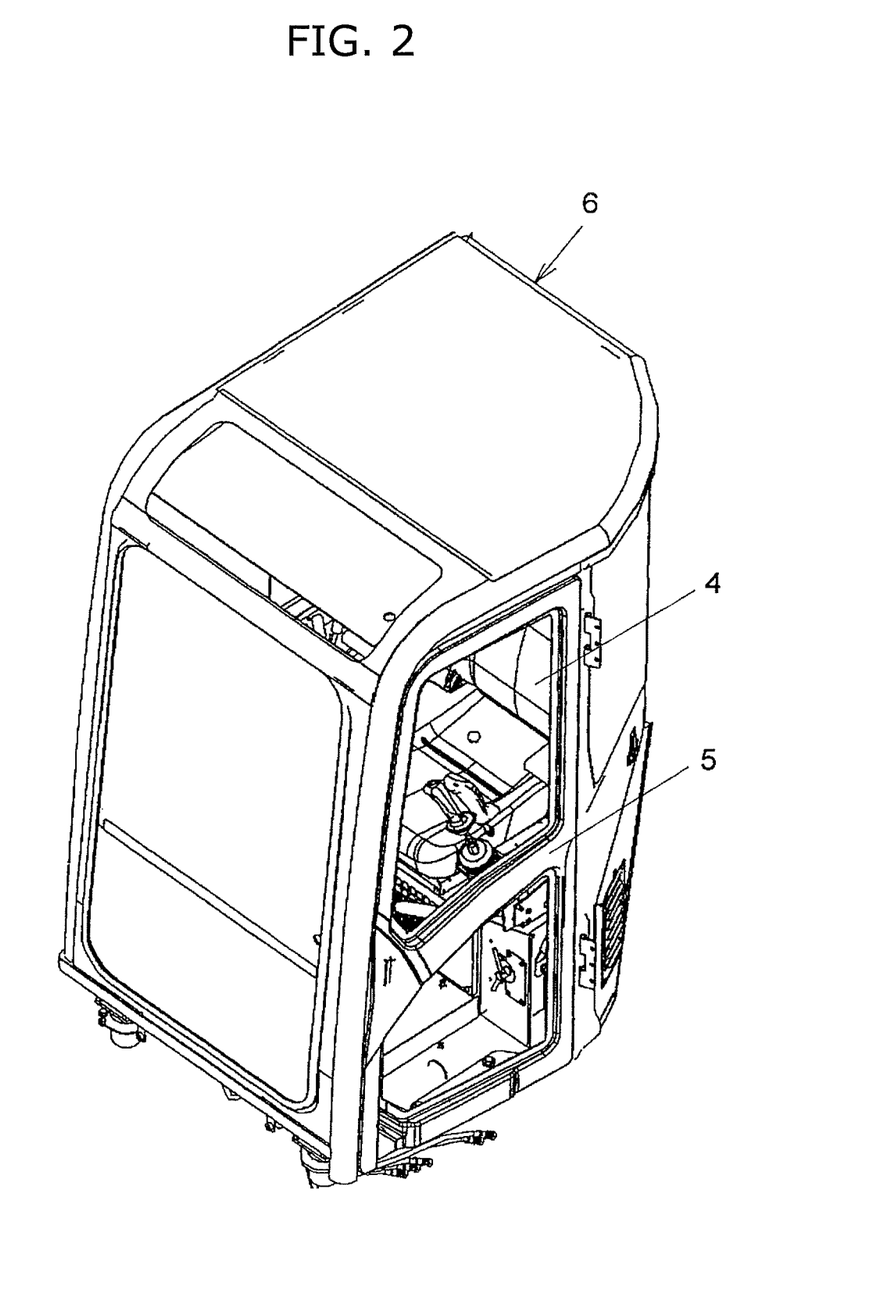
FIG. 2 A perspective view showing an operator's cab provided in the compact excavator shown in FIG. 1.

FIG. 1 is a side view showing a compact excavator arranged as an embodiment of a construction machine according to the invention. FIG. 2 is a perspective view showing an operator's cab provided in the compact excavator shown in FIG. 1.

As shown in these FIGS. 1 and 2, the construction machine according to this embodiment is constituted by a compact excavator which is a kind of small-size construction machine. The compact excavator has an undercarriage 1 having a pair of left and right crawler belts 1a, an upper structure 2 disposed on the undercarriage 1, and a work device 3 attached to the upper structure 2 so as to be rotatable in an up/down direction. The work device 3 includes a boom 3a attached to the upper structure 2, an arm 3b attached to a front end of the boom 3a, and a bucket 3c attached to a front end of the arm 3b.

An operator's cab 6 accommodating an operator's seat 4 and having a door 5 consisting of one door piece capable of opening and closing an opening surface 16 of a boarding port 20 which will be described later is disposed on the upper structure 2. In addition, an engine 7, a machine room 9 accommodating a not-shown pump etc. and covered with an exterior cover 8, and a counterweight 10 for securing a weight balance are disposed in the upper structure 2.

Figure 3:
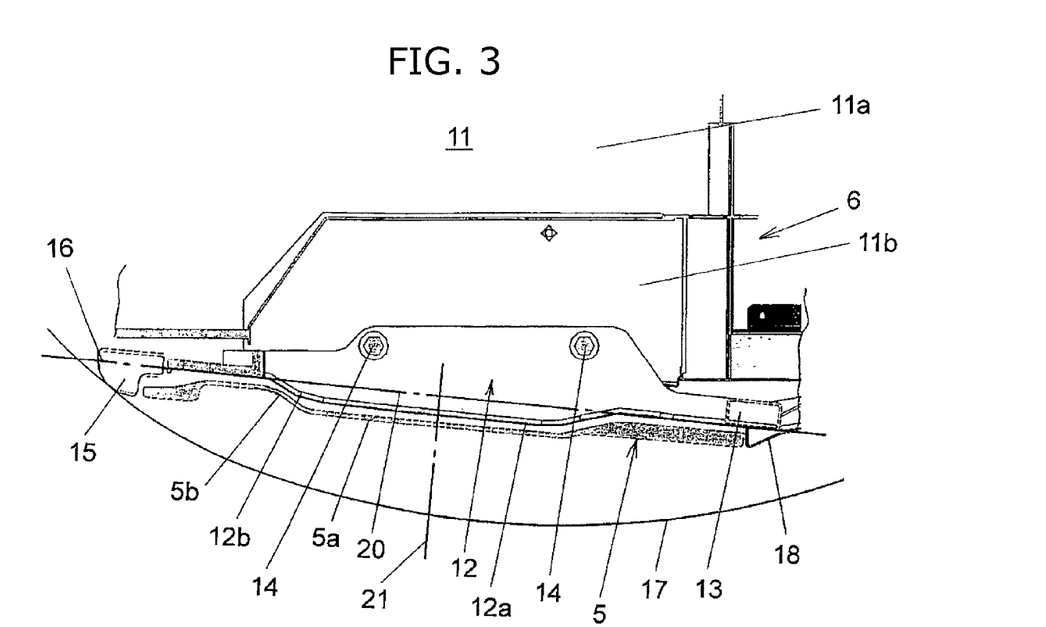
FIG. 3 A plan view showing in section a main portion of the operator's cab shown in FIG. 2 when a door is closed.
Figure 4:
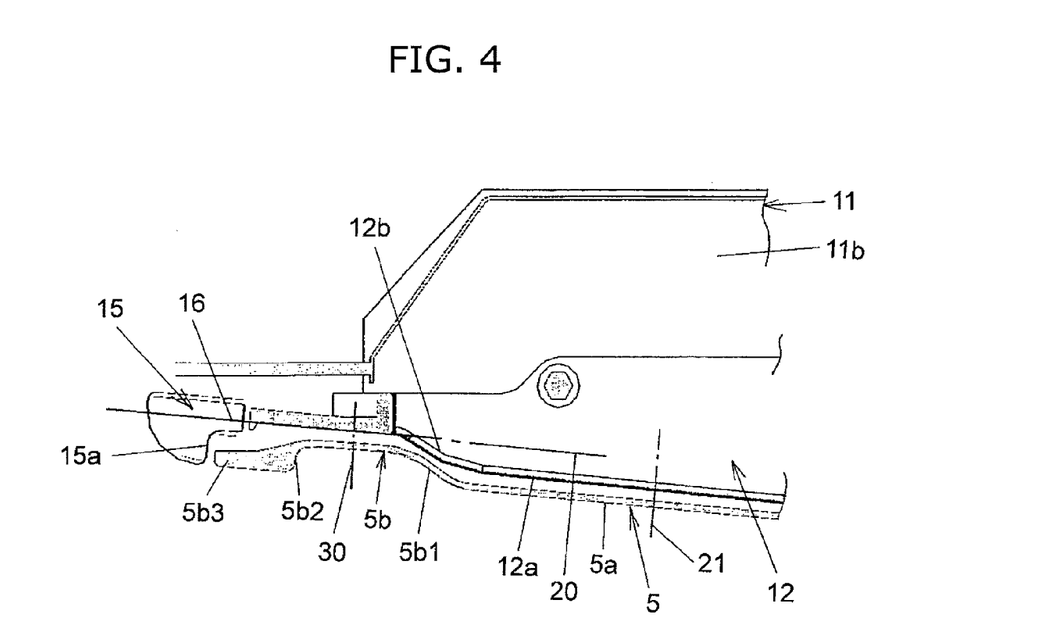
FIG. 4 A main portion enlarged view of FIG. 3.
Figure 5:
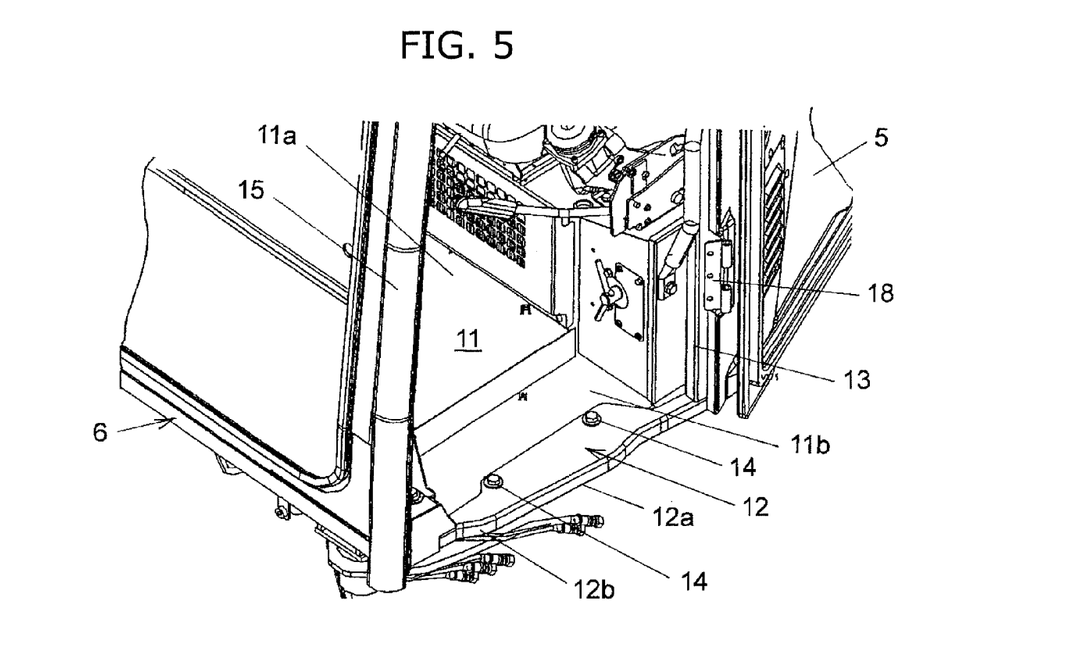
FIG. 5 A main portion perspective view showing the operator's cab shown in FIG. 2 when the door is open.
Figure 6:
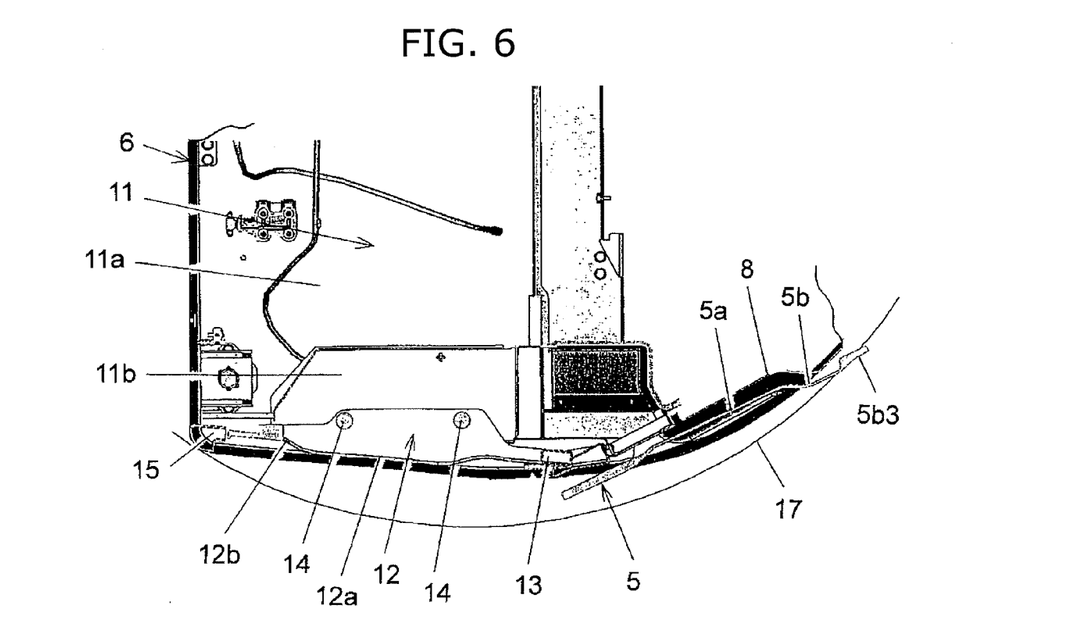
FIG. 6 A plan view showing in section a main portion of the operator's cab shown in FIG. 2 when the door is open.

FIG. 3 is a plan view showing in section a main portion of the operator's cab shown in FIG. 2 when the door is closed. FIG. 4 is a main portion enlarged view of FIG. 3. FIG. 5 is a main portion perspective view showing the operator's cab shown in FIG. 2 when the door is open. FIG. 6 is a plan view showing in section a main portion of the operator's cab shown in FIG. 2 when the door is open.

The compact excavator according to the embodiment is configured so that a protrusion portion 12a protruding outward from the opening surface 16 forming the boarding port 20 of the operator's cab 6 is provided in a part of a step which makes it easy to get on and off the operator's cab 6.

That is, as shown in FIGS. 3 to 6, a floor 11 of the operator's cab 6 includes a flat portion 11a disposed in front of the aforementioned operator's seat 4, and a step portion 11b disposed on the boarding port 20 side. The step portion 11b is provided continuously with the flat portion 11a and arranged in a lower position than the flat portion 11a. A flange portion 12 forming the same plane as that of the step portion 11b of the floor 11 is provided continuously with the step portion 11b in the operator's cab 6. The aforementioned step consists of the step portion 11b of the floor 11 and the flange portion 12. The protrusion portion 12a protruding outward from the opening surface 15 forming the boarding port 20 as shown in FIG. 4 is provided in the flange portion 12.

The flange portion 12 is removably fixed to a frame forming the operator's cab 6, by means of a pair of bolts 14. An end surface of a main portion of the protrusion portion 12a provided in the flange portion 12 is, for example, formed into a linear shape in a horizontal plane.

As shown in FIGS. 4 and 6, the operator's cab 6 has a pillar disposed on the work device 3 side, that is, a front pillar 15, and a pillar to which the door 5 is attached rotatably through hinges 18, that is, a door mounting pillar 13. The front pillar 15 and the door mounting pillar 13 are provided to put the boarding port 20 therebetween. As shown in FIG. 4, a flexing portion 12b which is formed so that the flexing portion 12b approaches the opening surface 16 forming the boarding port 20 as the flexing portion 12b approaches the front pillar 15 is provided in an end portion of the protrusion portion 12a of the flange portion 12 on the front pillar 15 side.

As shown in FIGS. 3 and 4, a convex portion 5a which covers the protrusion portion 12a provided in the flange portion 12 forming the step when the door 5 is in a closed state is provided in a part of a lower end portion of the door 5. A main portion of the convex portion 5a is formed into a flat surface shape in accordance with the linear shape of the end surface of the main portion of the protrusion portion 12a of the flange portion 12. The convex portion 5a is, for example, formed by press working for manufacturing the door 5.

In addition, according to the embodiment, as shown in FIGS. 3 and 4, the door 5 has a flexing portion 5b nearer the front pillar 15 than a center portion 21 of the door 5 when the door 5 is in a closed state.

As shown in FIG. 4, the flexing portion 5b is formed into a shape having a first area 5b1 formed to extend to a center vicinity 30 of the flexing portion 5b so that, when the door 5 is in a closed state, the first area 5b1 approaches the opening surface 16 of the boarding port 20 as the first area 5b1 approaches the front pillar 15, and a second area 5b2 which is arranged continuously with the first area 5b1 and nearer the front pillar 15 than the first area 5b1 and which is formed so that the second area 5b2 draws away from the opening surface 16 as the second area 5b2 approaches the front pillar 15.

In addition, as shown in FIGS. 5 and 6, the flexing portion 5b is formed into a shape which is disposed substantially inside a turning radius 17 of the upper structure 2 defined to be not larger than the vehicle width of the undercarriage 1 when the door 5 is in a completely open state. For example, as shown in FIG. 6, the flexing portion 5b is formed into a shape such that an end portion 5b3 of the second area 5b2 of the flexing portion 5b is located on the turning radius 17 when the door 5 is in a completely open state.

In addition, as shown in FIG. 4, the flexing portion 5b is formed into a shape such that the end portion 5b3 of the second area 5b2 of the flexing portion 5b is received in a recess portion 15a formed in the front pillar 15 when the door 5 is in a closed state. Further, as shown in FIG. 6, the flexing portion 5b forms a clearance portion which can prevent the door 5 from interfering with the exterior cover 8 of the upper structure 2 when the door 5 is completely open.

The basic outer shell shape of the operator's cab 6 is not changed. Therefore, the turning radius 17 shown in FIGS. 4 and 6 is set so that the turning radius 17 can keep a turning radius equivalent to that in a background-art compact excavator as described above, that is, a size not larger than the vehicle width defined by the paired crawler belts 1a of the undercarriage 1.

According to the embodiment configured thus, to sit on the operator's seat 4 in order to perform a work, an operator may open the door 5, put his/her foot on the step consisting of the step portion 11b of the floor 11 and the flange portion 12 having the protrusion portion 12a, climb on the flat portion 11a of the floor 11, and seat himself/herself on the operator's seat 4, as shown in FIGS. 5 and 6. The operator seated on the operator's seat 4 thus operates an operating lever disposed in the operator's cab 6, for example, to drive the work device 3 shown in FIG. 1. Thus, a desired work such as a soil excavation work can be carried out. When the door 5 is completely open, the door 5 is disposed to face the exterior cover 8 of the upper structure 2, as shown in FIG. 6. During the work, the door 5 may be closed if occasion demands.

When finishing the work, the operator may leave the operator's seat 4, move from the flat portion 11a of the floor 11 onto the step consisting of the step portion 11b and the flange portion 12, further step off onto the ground where the compact excavator is placed, and then close the door 5, for example, as shown in FIGS. 3 and 4. Thus, as shown in FIG. 4, the protrusion portion 12a of the flange portion 12 is covered with the convex portion 5a of the door 5 while the end portion 5b3 of the second area 5b2 of the flexing portion 5b of the door 5 is received in the recess portion 15a of the front pillar 15.

In the aforementioned embodiment, the end surface of the main portion of the protrusion portion 12a of the flange portion 12 is formed into a linear shape in a horizontal plane, and the main portion of the convex portion 5a of the door 5 is formed into a flat surface shape. However, the end surface of the main portion of the protrusion portion 12a of the flange portion 12 may be, for example, formed into a curved shape in a horizontal plane or formed into a shape with irregular portions. On the other hand, the convex portion 5a of the door 5 may be formed to have a curved surface in a horizontal plane or formed to have a curved surface in a vertical plane. The protrusion portion 12a and the convex portion 5a may be formed into various shapes.

According to the embodiment configured thus, the flexing portion 5b is provided nearer the front pillar 15 than the center portion 21 of the door 5, and the flexing portion 5b is formed into a shape including the first area 5b1 formed so that, when the door 5 is closed, the first area 5b1 approaches the opening surface 16 forming the boarding port 20 as the first area 5b1 approaches the front pillar 15, and the second area 5b2 which is arranged continuously with the first area 5b1 and which is formed so that the second area 5b2 draws away from the aforementioned opening surface 16 as the second area 5b2 approaches the front pillar 15. It is therefore possible to provide the door 5 whose shape does not bring about any change on the basic design of the operator's cab 6. That is, since it is not necessary to form the operator's cab 6 largely for installing the door 5, it is possible to secure the turning radius 17 not larger than the vehicle width. Thus, according to the embodiment, the work device 3 for slewing the upper structure 2 can be driven to perform a desired work without any trouble.

In addition, the flexing portion 5b is provided nearer the front pillar 15 than the center portion 21 of the door 5. It is therefore possible to form the center portion 21 of the door 5 to overhang outside the flexing portion 5b. Thus, it is possible to prevent the door 5 from gaining entrance into the operator's cab 6 while securing a large space in the operator's cab 6. This contributes to securing good operationality performed by the operator seated in the operator's cab 6.

In addition, since the door 5 consists of one door piece, a plurality of hinges 18 and members to which these hinges 18 are attached do not have to be provided in the center portion 21 of the door 5. Thus, the operator seated on the operator's seat 4 can secure a good field of view. In addition, it is possible to reduce the number of components. Thus, the manufacturing cost can be reduced.

Further, since the door 5 is provided with the flexing portion 5b nearer the front pillar 15 than the center portion 21, it is possible to secure high rigidity in the flexing portion 5b. Accordingly, it is possible to improve air tightness when the door 5 is closed. Thus, it is possible to obtain a highly reliable door structure in the operator's cab 6.

In addition, the flexing portion 5b is formed into a shape which is disposed substantially inside the turning radius 17 of the upper structure 2 defined to be not larger than the vehicle width of the undercarriage 1 when the door 5 is in a completely open state. Accordingly, even when a work is carried out in the state where the door 5 is completely open, the upper structure 2 can be slewed well without being influenced by the flexing portion 5b provided thus. Thus, the work can be carried out.

In addition, the recess portion 15a which receives the end portion 5b3 of the second area 5b2 of the flexing portion 5b when the door 5 is in a closed state is provided in the front pillar 15. Accordingly, the end portion 5b3 of the second area 5b2 of the flexing portion 5b provided in the door 5 is received in the recess portion 15a of the front pillar 15 when the door 5 is closed. Accordingly, the end portion 5b3 of the second area 5b2 can be prevented from being disposed outside the front pillar 15. This contributes to keeping the turning radius 17 not larger than the vehicle width.

In addition, according to the embodiment, as shown in FIG. 4, the protrusion portion 12a which protrudes outward from the opening surface 15 forming the boarding port 20 of the operator's cab 6 is provided only in a part of the flange portion 12 forming a step. Thus, the protrusion portion 12a can be provided in the step without changing the outer shell shape of the operator's cab 6. That is, the dimensions of the shape of the step can be increased without increasing the turning radius 17. Thus, the upper structure 2 can be slewed to drive the work device 3 so as to perform a desired work without any trouble. At the same time, getting on/off the operator's cab 6 can be performed easily.

In addition, when the door 5 is closed, the protrusion portion 12a of the flange portion 12 is covered with the convex portion 5a provided in the door 5, so that the whole step including the protrusion portion 12a can be located in the operator's cab 6. It is therefore possible to prevent fallen snow from being frozen in the step including the protrusion portion 12a even when the compact excavator is placed in a cold district where snow falls. Accordingly, the situation that the door 5 cannot be opened due to the frozen snow can be avoided so that the door 5 can be opened and closed smoothly.

A plurality of combinations of the flange portion 12 having the protrusion portion 12a and the door 5 having the convex portion 5a may be taken into account in advance. That is, protrusion portions 12a having different shapes from each other or convex portions 5a having different shapes from each other may be taken into account in advance. It is therefore possible to easily obtain an operator's cab 6 having a combination of a selected flange portion 12 and a selected door 5 without having any change in the basic design of the operator's cab 6.

In addition, as shown in FIG. 6, the flexing portion 5b of the door 5 forms a clearance portion for preventing interference with the exterior cover 8 forming the upper structure 2. It is therefore possible to suppress damage of the door 5 and damage of the exterior cover 8 when the door 5 is operated to be open. Thus, a highly reliable compact excavator can be obtained.

The aforementioned embodiment consists of a compact excavator. However, the construction machine according to the invention may be a hydraulic excavator which is larger than the compact excavator. In addition, the construction machine may be any construction machine different from the hydraulic excavator as long as the construction machine has an upper structure provided on an undercarriage and an openable door provided on the upper structure.

REFERENCE SIGNS LIST 1 undercarriage
2 upper structure
3 work device
4 operator's seat
5 door
5a convex portion
5b flexing portion
5b1 first area
5b2 second area
5b3 end portion
6 operator's cab
8 exterior cover
11 floor
11a flat portion
11b step portion
12 flange portion
12a protrusion portion
12b flexing portion
13 door mounting pillar
15 front pillar
15a recess portion
16 opening surface
17 turning radius
20 boarding port
21 center portion
30 center vicinity

The invention claimed is:
1. A construction machine, comprising:
an undercarriage, an upper structure disposed on the undercarriage, a work device attached to the upper structure, and an operator's cab provided on the upper structure and having a door capable of opening and closing an opening surface forming a boarding port, the operator's cab including a front pillar and a door mounting pillar which are provided to put the boarding port therebetween, the front pillar being disposed on the work device side, the door being rotatably attached to the door mounting pillar, wherein:

the door comprises one door piece, and has a flexing portion which is closer to the front pillar than a center portion of the door when the door is in a closed state; and the flexing portion is formed into a shape having a first area which is formed so that, when the door is in a closed state, the first area approaches the opening surface as the first area approaches the front pillar, and a second area which is arranged continuously with the first area and nearer the front pillar than the first area and which is formed so that the second area draws away from the opening surface as the second area approaches the front pillar.

2. A construction machine according to claim 1, wherein:
the flexing portion is formed into a shape which is disposed substantially inside a turning radius of the upper structure defined to be not larger than a vehicle width of the undercarriage when the door is in a completely open state.

3. A construction machine according to claim 2, wherein:
the flexing portion is formed into a shape in which an end portion of the second area of the flexing portion is located on the turning radius when the door is in a completely open state.

4. A construction machine according to claim 3, wherein:
a recess portion which receives the end portion of the second area of the flexing portion when the door is in a closed state is provided in the front pillar.

5. A construction machine according to claim 4, wherein:
the construction machine consists of a compact excavator, which is provided with a step for making it easy to get on and off the operator's cab, and a protrusion portion which protrudes outward from the opening surface is provided in a part of the step while a convex portion which covers the protrusion portion of the step when the door is in a closed state is provided in a part of the door.

* * * * *